United States Patent
Zhang et al.

(10) Patent No.: US 11,042,145 B2
(45) Date of Patent: Jun. 22, 2021

(54) AUTOMATIC HEALTH INDICATOR LEARNING USING REINFORCEMENT LEARNING FOR PREDICTIVE MAINTENANCE

(71) Applicant: Hitachi, Ltd., Tokyo (JP)

(72) Inventors: Chi Zhang, San Jose, CA (US);
Chetan Gupta, San Mateo, CA (US);
Ahmed Khairy Farahat, Santa Clara, CA (US); Kosta Ristovski, San Jose, CA (US); Dipanjan Ghosh, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 16/007,892

(22) Filed: Jun. 13, 2018

(65) Prior Publication Data
US 2019/0384257 A1 Dec. 19, 2019

(51) Int. Cl.
| G05B 19/40 | (2006.01) |
| G05B 19/4065 | (2006.01) |
| G05B 19/042 | (2006.01) |
| G06F 11/34 | (2006.01) |
| G06N 20/00 | (2019.01) |

(52) U.S. Cl.
CPC ..... *G05B 19/4065* (2013.01); *G05B 19/0428* (2013.01); *G06F 11/3447* (2013.01); *G06N 20/00* (2019.01)

(58) Field of Classification Search
None
See application file for complete search history.

(56) References Cited

U.S. PATENT DOCUMENTS

| 5,465,321 A | 11/1995 | Smyth | |
| 10,416,617 B2 * | 9/2019 | Shiraishi | G05B 13/0265 |
| 2004/0015386 A1 * | 1/2004 | Abe | G06Q 30/0234 |
| | | | 705/7.29 |

(Continued)

FOREIGN PATENT DOCUMENTS

| CN | 104504296 B | 8/2017 | |
| EP | 2549415 A1 | 1/2013 | |
| WO | WO-2018070038 A1 * | 4/2018 | G06N 20/00 |

OTHER PUBLICATIONS

"Sunil Ray, 7 Regression Techniques you should know!, Aug. 4, 2015, Analytics Vidhya, https://www.analyticsvidhya.com/blog/2015/08/comprehensive-guide-regression/" (Year: 2015).*
Liu, K. et al., "A Data-Level Fusion Model for Developing Composite Health Indices for Degradation Modeling and Prognostic Analysis," IEEE Transactions on Automation Science and Engineering, vol. 10, 2013, 13 pages.
Li, X. et al., "Fault Prognostic Based on Hybrid Method of State Judgment and Regression," Advances in Mechanical Engineering, vol. 5, 2013, 10 pages.

(Continued)

*Primary Examiner* — Santosh R Poudel
(74) *Attorney, Agent, or Firm* — Procopio, Cory, Hargreaves & Savitch LLP

(57) ABSTRACT

Example implementations described herein are directed to systems and methods for predictive maintenance with health indicators using reinforcement learning. An example implementation includes a method to receive sensor data, operational condition data, and failure event data and generate a model to determine health indicators that indicate equipment performance based on learned policies, state values, and rewards. The model is applied to external sensor readings and operating data for a piece of equipment to output a recommendation based on the model.

14 Claims, 10 Drawing Sheets

(56) References Cited

U.S. PATENT DOCUMENTS

| | | | |
|---|---|---|---|
| 2006/0259198 A1* | 11/2006 | Brcka | G05B 23/0254 |
| | | | 700/246 |
| 2010/0023307 A1* | 1/2010 | Lee | G05B 23/0254 |
| | | | 703/7 |
| 2014/0358398 A1* | 12/2014 | Brunschwig | F01D 21/003 |
| | | | 701/100 |
| 2015/0057973 A1 | 2/2015 | Saravanapriyan et al. | |
| 2015/0268307 A1 | 9/2015 | Inguva et al. | |
| 2017/0031330 A1* | 2/2017 | Shiraishi | B29C 45/762 |
| 2017/0186249 A1* | 6/2017 | Bandy | G07C 5/0816 |
| 2018/0098381 A1* | 4/2018 | Pereira | F24C 7/085 |
| 2018/0210431 A1* | 7/2018 | Tong | G05B 19/404 |
| 2018/0374104 A1* | 12/2018 | Meusel | G05B 23/024 |
| 2019/0025803 A1* | 1/2019 | Akitomi | G05B 13/021 |
| 2019/0121319 A1* | 4/2019 | Xia | G05B 19/4065 |

OTHER PUBLICATIONS

Ramasso, E., "Investigating Computational Geometry for Failure Prognostics in Presence of Imprecise Health Indicator: Results and Comparisons on C-MAPSS Datasets," International Journal of Prognostics and Health Management, vol. 5, 2014, 13 pages.

Ramasso, E. et al., "Performance Benchmarking and Analysis of Prognostic Methods for CMAPSS Datasets," International Journal of Prognostics and Health Management, vol. 5, No. 2, 2014, pp. 1-15.

Saxena, A., et al., "Damage Propagation Modeling for Aircraft Engine Run-to-Failure Simulation.", International Conference on Prognostics and Health Management, 2008, 9 pages.

* cited by examiner

AUTOMATIC HEALTH INDICATOR LEARNING USING REINFORCEMENT LEARNING FOR PREDICTIVE MAINTENANCE

BACKGROUND

Field

The present disclosure relates generally to predictive maintenance, and more specifically, to health indicator learning using reinforcement learning for predictive maintenance.

Related Art

Maintenance is a process with an objective of keeping the equipment in a working efficient and cost-effective condition. The maintenance process is conducted by performing the necessary actions on the equipment to achieve one or more of these objectives. Equipment maintenance can be conducted in one of the following strategies: (a) Corrective Maintenance: taking corrective actions after the equipment or one of its components fails to retain its working status; (b) Preventive Maintenance (also known as time-based maintenance): performing maintenance actions on a regular basis regardless of the condition of the equipment; (c) Predictive Maintenance (also known as condition-based maintenance): continually monitoring the condition of the equipment to determine maintenance actions need to be taken at certain times.

In related art implementations, Predictive Maintenance (PdM) approaches can depend on encoding information about pre-failure conditions of the equipment and then monitoring real-time sensor and event data searching for these conditions. The information about pre-failure conditions can be: (a) rule-based (e.g., "$C_1<10$, and $B_4>1000$ for more than 10 hours") or (b) model-based (e.g., "a simulation of the normal behavior of the equipment"). Predictive maintenance can reduce the chance of unexpected failures, increases the equipment availability, and accordingly decreases the overall cost of the maintenance process. Based on how this information can be obtained, predictive maintenance approaches can be classified into: (a) Knowledge-driven approaches; and (b) Data-driven approaches.

In knowledge-driven approaches, information about pre-failure conditions (rules or models) is manually encoded by the equipment manufacturer or other experts in the equipment domain. Knowledge-driven approaches may be limited to the knowledge of domain experts about possible patterns of pre-failure conditions. For complex equipment, the actual behavior of the equipment can oftentimes be different from any simulation models or pre-defined rules. Related art knowledge-driven predictive maintenance approaches are labor intensive, equipment specific, and require domain expertise.

In data-driven approaches, information about pre-failure conditions (rules or models) is learned from historical sensor data and event logs. One category of data-driven approaches is supervised and depends on classification techniques to learn complex rules for anomaly detection from examples of failures that happened in the past. Supervised data-driven approaches require the availability of sufficient examples of failures, which can be impractical for many types of equipment (e.g., aircrafts). For example, modern industrial equipment has been developed that is highly reliable to minimize failures and faults creating a scarcity of data for examples of failures that happened in the past. A second category of data-driven approaches is unsupervised and learns models of normal behaviors from historical data to detect any deviation from this normal behavior. Unsupervised data-driven approaches do not generally require examples of failures. However, related art unsupervised data-driven approaches are typically equipment type specific and require domain expertise to configure the models, for example using manually hand-crafted Key Performance Indicators (KPIs) by domain experts. Accordingly, related art unsupervised data-driven predictive maintenance approaches are inefficient and can be inaccurate when applied to different types of equipment.

SUMMARY

An example implementation includes a method to receive sensor data, operational condition data; and failure event data and generate a model to determine health indicators that indicate equipment performance based on learned policies, state values, and rewards. The model is applied to external sensor readings and operating data for a piece of equipment to output a recommendation based on the model.

Aspects of the present disclosure can include a system with a memory and a processing device operatively coupled to the memory, wherein the processing device is configured to receive sensor data, operational condition data, and failure event data and generate a model to determine health indicators that indicate equipment performance based on learned policies, state values, and rewards. The system applies the model to external sensor readings and operating data for a piece of equipment and outputs a recommendation based on the model.

Aspects of the present disclosure can include a non-transitory computer readable medium storing instructions where a processing device is configured to receive sensor data, operational condition data, and failure event data and generate a model to determine health indicators that indicate equipment performance based on learned policies, state values, and rewards. The instructions apply the model to external sensor readings and operating data for a piece of equipment to output a recommendation based on the model.

Aspects of the present disclosure can include a means for predictive maintenance with health indicators using reinforcement learning. An example implementation includes a means for receiving sensor data, operational condition data, and failure event data; and generating a model to determine health indicators that indicate equipment performance based on learned policies, state values, and rewards. The example implementation includes means for applying the model to external sensor readings and operating data for a piece of equipment to output a recommendation based on the model.

DETAILED DESCRIPTION

Figure 1:
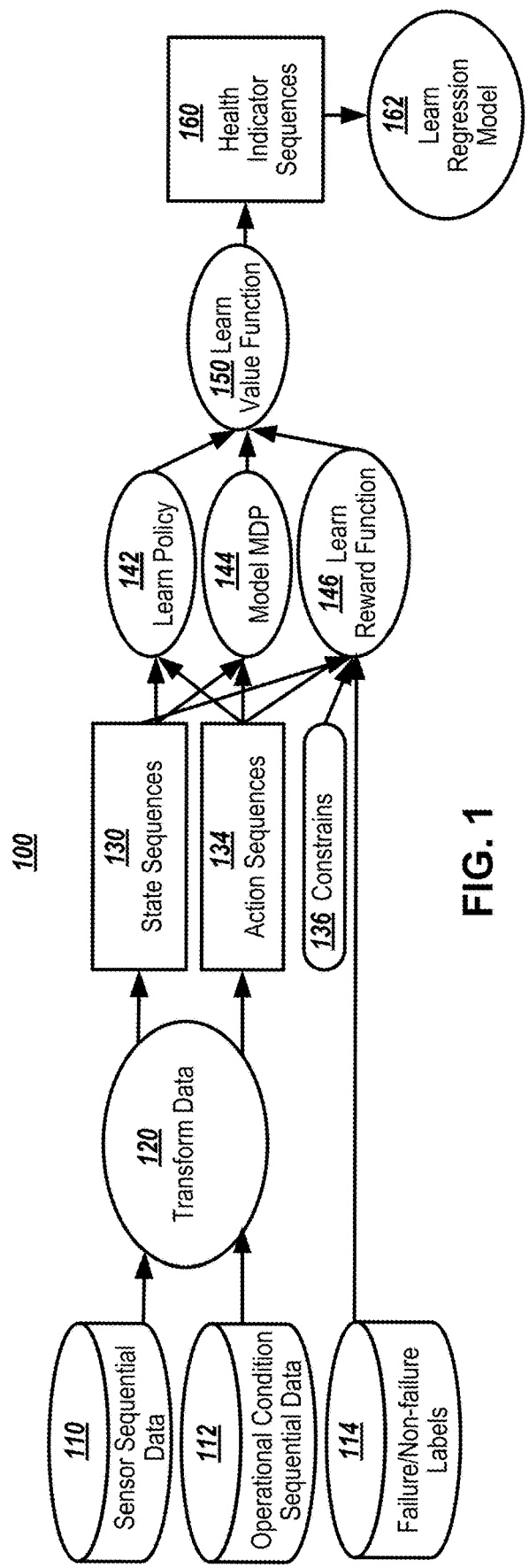
FIG. 1 illustrates an example health indicator learning process in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Predictive Maintenance (PdM) approaches continually monitor the condition of equipment to determine maintenance actions timing to reduce the chance of unexpected failures, increase equipment availability, and decrease costs of the maintenance process.

Health indicator learning approaches in PdM generally learns a composite index to represent the health condition of the equipment based on data of historical faults and/or failures. Faults can refer to a state of the equipment that is sub-optimal but usable. Failure can refer to a state of the equipment when it is not usable. Health indicators can be used in PdM in multiple ways:

(a) Anomaly detection (AD): when health indicators are below certain threshold, it identifies the equipment falls into failures and triggers an alarm.

(b) Failure prediction (FP): which gives predictions (e.g., a probability or a yes/no answer) of whether failures will happen within a given prediction time window.

(c) Remaining Useful Life (RUL) estimation: which predicts the residual life of the equipment given the observed data.

(d) Operation recommendation (OR): which evaluates the effect of different operations and recommend appropriate operations to avoid sever health performance degradation.

Predictive maintenance approaches typically depend on encoding information about pre-failure conditions of the equipment and then monitoring real-time sensor and event data searching for these conditions. For example, in industrial analytics, the equipment health indicators are traditionally empirically decided using domain knowledge (e.g., hand-crafted Key Performance Indicators (KPIs)). However, industrial equipment is growing more complex and integrated with more systems and subsystems, such that human experts to develop the KPIs for each type of equipment requires considerable time and expense to develop. Further, industrial equipment has been developed that is highly reliable to minimize failures and faults, related art data-driven PdM approaches suffer from the lack of real data for failures and/or faults to accurately predict required maintenance.

Related art data-driven PdM approaches fail to learn health indicators representing the equipment's true health conditions due to the lack of sufficient data regarding failures and faults. Some related art approaches artificially create labels based on available failure and/or fault information or assume certain distributions for health conditions. Additionally, each piece of equipment is typically operated with different operation conditions and can fall into multiple failure modes, which make it more difficult to characterize the health conditions with KPIs.

Aspects of the present disclosure include a multi-phase data-driven method to automatically learn health indicators which can be applied to address a wide range of PdM problems. Example aspects of the method automatically learn a composite health indicator that is independent of reliance on expert crafted domain knowledge and is capable of describing the equipment health status under multiple operation conditions and failure modes.

An example implementation described herein is directed predictive maintenance with health indicators using reinforcement learning. An example implementation includes a method to receive sensor data, operational condition data, and failure event data; and generate a model to determine health indicators that indicate equipment performance based on learned policies, state values, and rewards. The model is applied to external sensor readings and operating data for a piece of equipment to output a recommendation based on the model.

Example implementations automatically learn health indicators for failures (e.g., AD, FP), predict RUL, and recommend operations to avoid sever health degradation (e.g., Operation Recommendation (OR)). An example aspect of the present disclosure includes health indicators which reflect the true performance of the equipment especially over a long period of time. An example aspect of the method automatically learns health indicators obtains improved performance in AD and significantly outperforms conventional approaches in RUL prediction.

Reinforcement learning (RL) is a machine learning method using rewards to determine an ideal behavior or action that maximizes performance within a specific context. Reinforcement Learning (RL) is used to automatically learn health indicators based on the historical operation and sensory data, with or without failure/fault labels. The equipment health indicator learning problem is developed as a credit assignment problem and solved using RL approaches. As described herein, example implementations automatically learn underlying machine health conditions without imposing any empirical knowledge that can be used to recommend a range of PdM tasks.

Example aspects of the present disclosure include a RL-based data-driven approach that does not assume knowledge of an exact mathematical model, can be applied when failures are rare or failure data is unavailable, and is independent of artificial labels. That is, the method is independent of artificial labels and can function when failure and/or fault information is missing. As used herein, failure and/or fault are used interchangeably to refer to a fault state, a failure state, or combination when the equipment is in sub-optimal condition. Equipment performance degradation is usually a mix of sudden and/or slow changes and heavily depends on various operating conditions which make it infeasible to fit any known distribution into the data. An example aspect of the present disclosure is capable of automatically learning health indicator scores without assuming any arbitrary distributions.

By learning a composite health indicator, the methods can solve for AD, FP, RUL, and OR with a single solution. ORs can include one or more actions for changing an operation condition (e.g., oil level, throughput, temperature, etc.) to prevent the severe health indicator degradation. For example, the OR can include changing the speed a piece of equipment is operating when the learned health indicator is associated with prolonged operation at a different speed.

FIG. 1 illustrates an example health indicator learning process 100 in accordance with an example implementation. The multi-phase data-driven method can include the learning process 100 that is used with an application and/or testing phase as discussed further in reference to FIG. 4.

An example implementation includes automatic heath indicator learning based on sensor sequential data 110 and operation condition sequential data 112 from a set or type of equipment. Implementations can be applied to a wide range of industries where domain specific KPIs are expensive, difficult, or impossible to access. For example, health indicator sequences 160 can be scores used for predictive maintenance on a type of automobile or industrial equipment. The multi-phase data-driven method can be used across different types of equipment and different industries (e.g., industrial equipment, automobiles, digital systems, etc.). In an example implementation, health indicator learning process 100 is applied once to a set or type of equipment that can be repeated applied to a data stream of observed equipment states to perform AD, FP, RUL, and OR during the application phase as described in reference to FIG. 4.

The health indicator learning process 100 can receive input including:

(a) Sensor sequential data 110: Sensor sequential data 110 can involve streaming and historical time series data collected from different sensors measuring desired metrics of components or other aspects of an apparatus. Each sensor reading is associated with a timestamp that specifies the date and time of the reading.

(b) Operation condition sequential data 112 can include data that describes information about the characteristic of the equipment and environment in which the equipment is installed. Such operation condition sequential data 112 can include, but is not limited to, the specifications of the equipment, operation statistics (e.g., operation speed), environment conditions (e.g., location, temperature, humidity), maintenance records (e.g., date, conditions, notes), etc.

(c) Failure/Non-failure Labels 114: Failure/Non-failure Labels 114 can be past events regarding failures and/or non-failure information of the equipment. Failure/Non-failure Labels 114 is optional and can include data for failure events when the equipment is not usable, and non-failure event, for example, faults when the equipment performance is degraded but useable. Failures and/or non-failure events can be associated with a time-stamp associated with the event. The Failure/Non-failure Labels 114 may also have associated attributes like the type of the failure, the particular component that failed, other attributes related to the cause of the failure or indication of non-failure, the repair actions, and additional attributes according to the desired implementation.

In an example implementation, the health indicator learning process 100 includes stages to transform data 120 into state sequences 130, and action sequences 134 that are used to learn policy 142, and model Markov Decision Process (MDP) 144. Sensor sequential data 110 and operation condition sequential data 112 is used to build a state machine as described in reference to FIG. 2A and model MDP 144 as described in reference to FIG. 2B. It should be noted that this method is not limited to MDP and other state-machines can be used to model the health performance degradation process (e.g., Partially Observed MDP, Hidden Markov Model, Markov Chain, etc.).

Failure/Non-failure Labels 114 is used with given constraints 136 to learn a reward function 146. The learned reward function 146 is indicating the instant benefit of being in a state. The Failure/Non-failure Labels 114 and constraints are used to learn a reward function 146 that is used with the learn policy 142, model MDP 144 to learn value function 150 to derive health indicator sequences 160. A learned regression model 162 is output as described in reference to FIGS. 4 and 7.

Figure 2A:
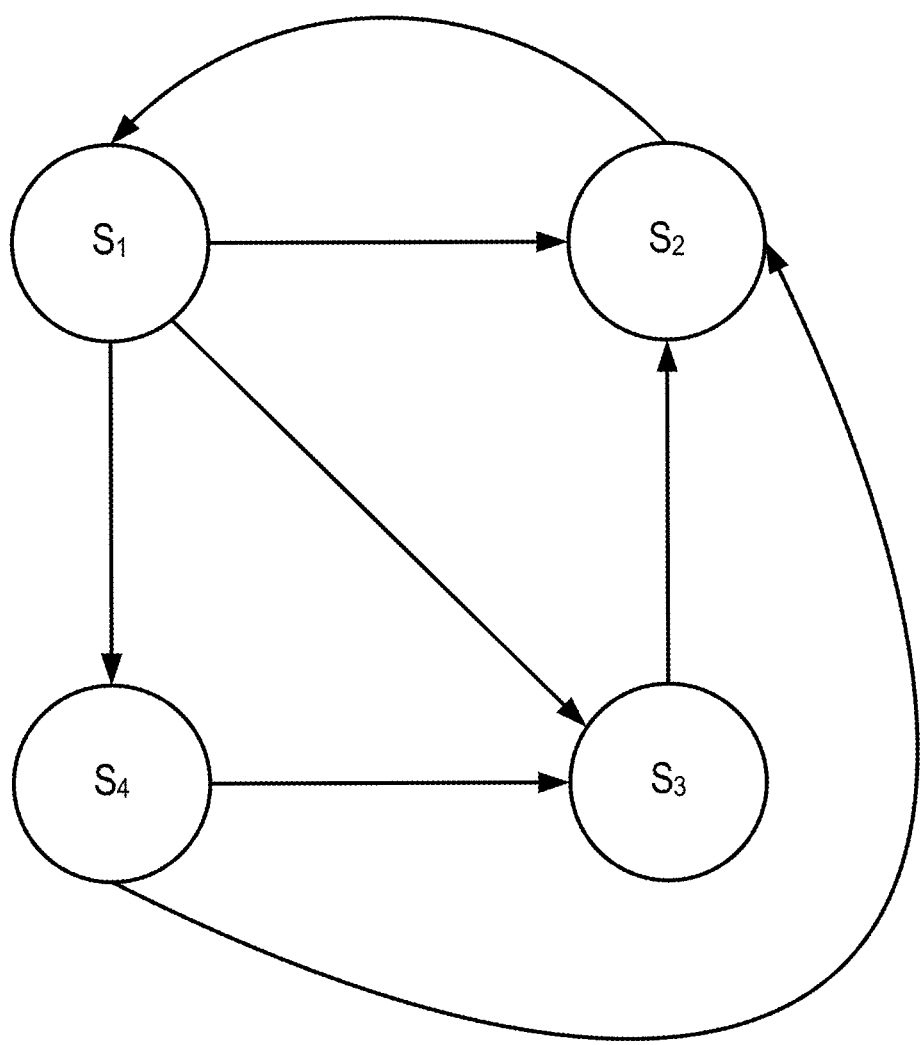
FIG. 2A illustrates a graph of an example state machine for equipment health transition process modeling in accordance with an example implementation.
Figure 2B:
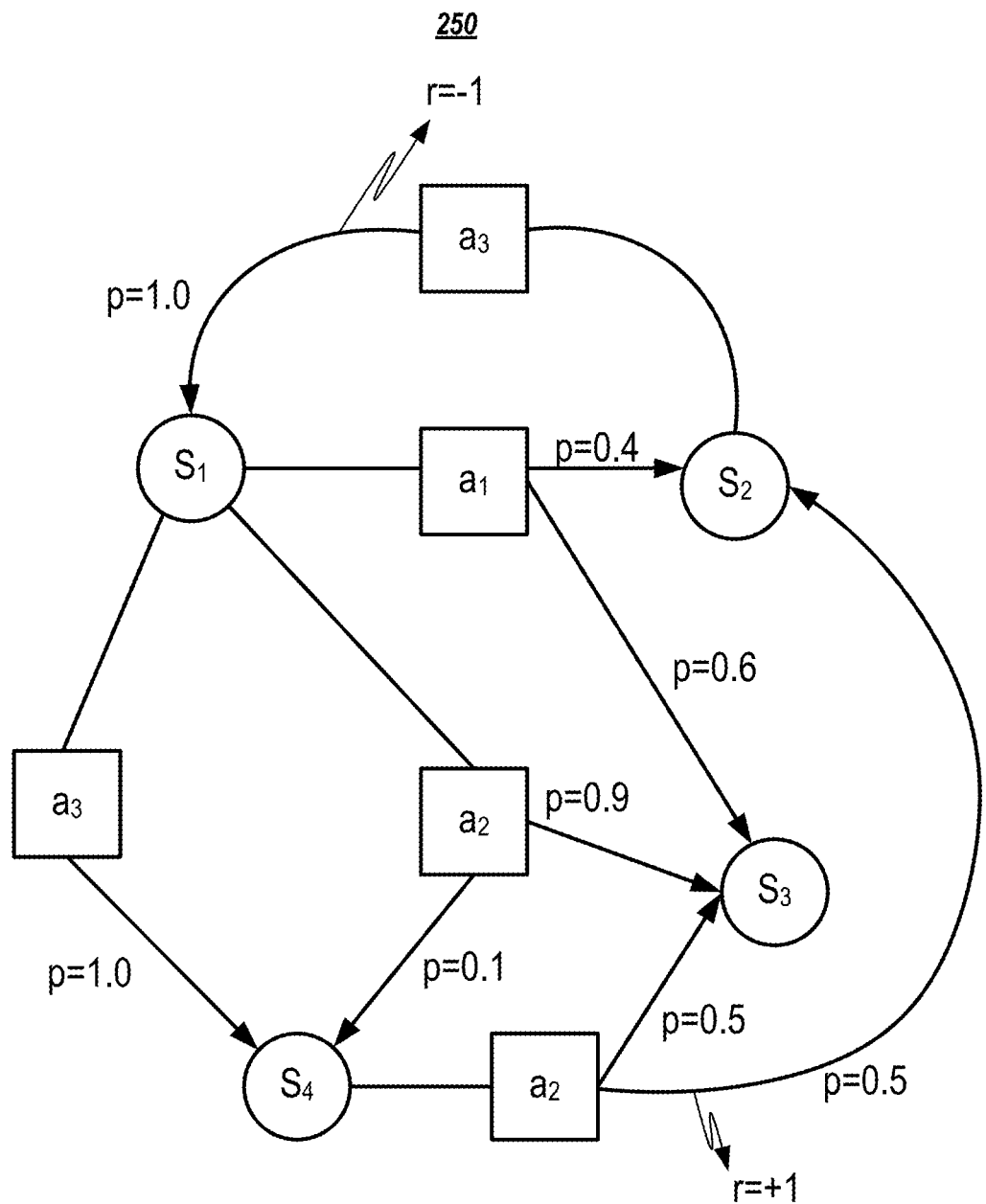
FIG. 2B illustrates a graph of an example decision process for machine states in accordance with an example implementation.

The health indicator sequences 160 are derived for each state of the equipment as described in reference to FIGS. 2A and 2B. During the application phase, the learned value function 150 can be applied to observed equipment states to construct a sequence of health indicators that can be used to perform AD, FP, RUL, and OR as described in reference to FIG. 4.

FIG. 2A illustrates a graph 200 of an example state machine for equipment health transition process modeling in accordance with an example implementation. The health degradation process of the equipment is modeled using a state machine, with each node in graph 200 representing a state of the equipment in 130. The health indicator learning process includes stages for transform data 120, learn policy 142, and modeling (e.g., model MDP 144). RL is used to automatically learn health indicators based on the historical operation and sensory data, with or without failure/fault labels.

The health degradation process of the equipment is modeled using a state machine with each node S1, S2, S3, S4 representing a state of the equipment. For example, each state of the equipment S1, S2, S3, S4 is represented in the directed graph 200. Sensor sequential data 110 and operation condition sequential data 112 is used to build the state machine. Failure/non-failure information of the equipment (e.g., Failure/Non-failure Labels 114) can be used with constraints 136 to learn a reward function. The leaned policies, MDP model, and reward function are combined to learn a value function to produce health scores of states, and the health score sequences are used to learn a regression model. For example, state transitions from S4 to S2 can represent changes of health conditions (e.g., automobile breaking system) due to wear-and-tear under regular operations. Values of each state S1, S2, S3, S4 can be learned based on given failure related information using the model. Then, the health indicator learning problem is formulated as a credit assignment problem and solved by RL as further described in reference to FIGS. 5-7.

A health indicator can describe a relative measure for a specific piece of equipment relative to the health of a population. In an example implementation, the health indicator is a composite based on sensor data and RL. Related are implementations for equipment health condition evaluations (e.g., performance degradation detection) heavily depend on domain knowledge to define the health index of the equipment given raw sensor measurements and can only estimate health scores at a current moment without the capability of predicting failure probabilities, estimating RUL, or recommending optimized operations to extend RUL. However, the method described herein automatically learns the underlying equipment health conditions without imposing any empirical knowledge, and can be used to accomplish a large range of PdM tasks (e.g., AD, FP, RUL). The state machine is used to learn the underlying health indicators and predict the failures to provide guidance for operation optimization.

FIG. 2B illustrates a graph 250 of an example decision process for machine states in accordance with an example implementation. Transform data 120 can transform sensory data 110 and operation condition sequential data 112 into discrete states S1, S2, S3, S4 and actions a1, a2, a3. The graph 250 illustrates a MDP representing state transitions under different actions and learned policies (e.g., state-action mappings) from the data. For example, an action can be to change an operation condition of equipment such as the speed, acceleration, component angle, temperature, etc. An action can also be to maintain an operation condition (e.g., do not take an action).

In an example implementation, MDP is used for the state machine with actions (e.g., a1, a2, a3) and rewards r. The example MDP model can discover evolution of health indicators automatically by learning values for N discrete sensory states as discussed in reference to FIGS. 5-7. The MDP model uses operation data (e.g., actions a1, a2, a3) separately from sensory data (e.g., states S1, S2, S3, S4). Value functions can be learned by an iterative policy evaluation algorithm. For example, learn value function 150 solves for the Bellman Expectation Equation with Dynamic Programming (DP) and rewards. The learned values of states are used as health indicator sequences 160. To find hyper parameters of RL models that best fit the health degradation process, two widely accepted properties are used as constraints to depict the degradation behavior.

Policy can refer the probability of taking an action given a current state of the equipment. The reward can indicate the impact of a failure or non-failure. For example, a new piece of equipment can start with a health indicator of 1 and based on applied actions, the health of the equipment can change. A health indicator score of 0.0 can indicate the equipment has failed and is no longer useful and/or requires repair and maintenance actions.

In an example implementation, states S1, S2, S3, S4 can indicate a failure and/or fault identified from failure event data. In response to an action being applied, the equipment changes to a different state and the reward indicates the impact on the health of the equipment for the change from the initial state to the resulting state. For example, the equipment in state S1 with applied action a1 to increase a rate of acceleration can change to in state S2 with the probability as p=0.4. In an example, the equipment in state S1 with applied the same action a1 to can change to state S3 with the probability as p=0.6, due to the stochastics in the environment (i.e., starting from the same initial state and taking the same action can results in different next states). In another example, the equipment in state S1 with applied action a2 to apply a breaking component can change to state S3 with probability as p=0.9. Due to the stochastic nature of the environment, applying the action a2 at state S1 can also changes to state S4 with probability as p=0.1. Further, applying an action a3 at state S1 can be an inaction that changes to state S4 with the probability as p=1.0 while applying the action a3 for inaction at state S2 changes the equipment to state S1 with the probability as p=1.0 and the reward as r=−1. In another example, applying an action a2 at state S4 can have a probability of p=0.5 that changes to state S2 will have a reward of r=+1. The rewards r=−1 and +1, are used to calculate health indicator scores that describe a relative health status of the equipment based the associated action applied to the state.

Figure 4:
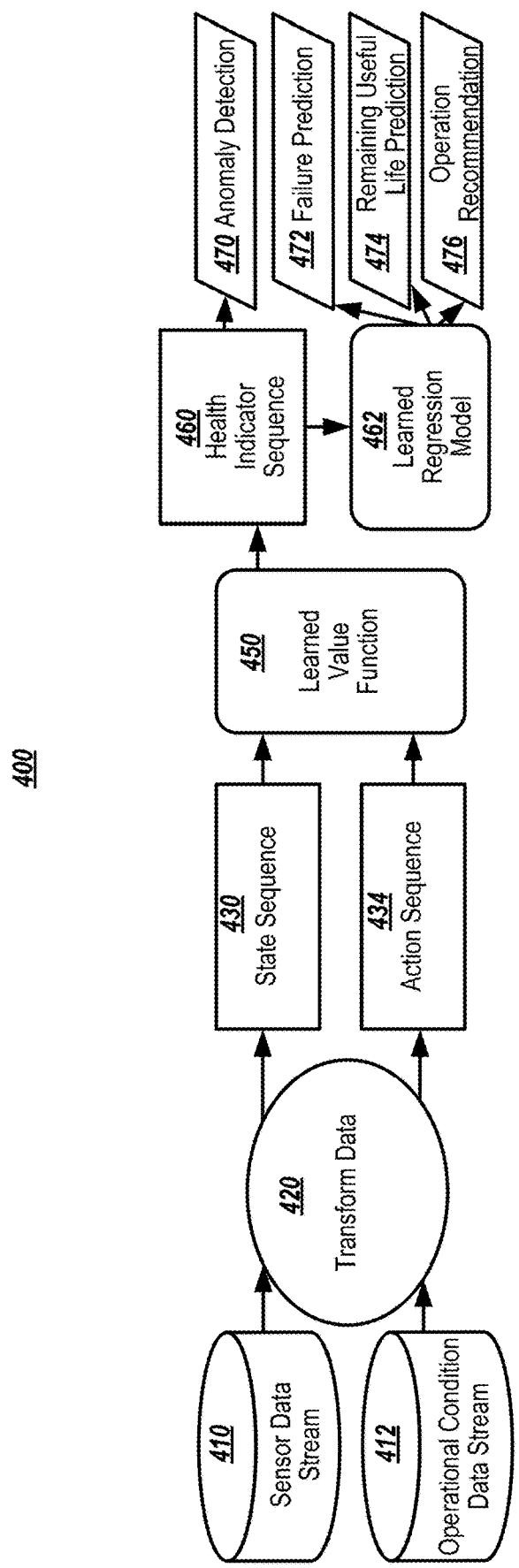
FIG. 4 illustrates an example health indicator application process in accordance with an example implementation.

The state machine is used during an application phase as described in reference to FIG. 4 to apply AD, FP, RUL, and/or OR, as described in reference to FIG. 4. The state machine can be applied to equipment with complex behaviors and health indicators that are not easily fitted to arbitrary distributions, applications that require both FP and RUL predictions, and/or applications where OR is valuable and multiple operation strategies are available for operators to choose from.

In an example application phase, the learned health indicators can be combined with regression models to predict failures based on an initial state and a given policy. A health indicator sequence representing the evolution of equipment performance is used with a learned failure threshold and a confidence level to identify failures in the sequence. For example, when the initial state is matched to a health indicator sequence using the MDP modeling, FP and RUL tasks can be performed. When multiple policies or actions are given, the predicted health indicators are used to compare and find the health indicators in the sequence that lead to undesired health degradation and alert operators to avoid them in a timely manner.

In alternative implementations for types of equipment which do not have explicit actions, the example MDP model can be easily transformed to Markov Chain by removing or merging a_i into s_i, such that <s_i, a_i> is transformed to new node s'_i.

Other alternative implementations can include Partially Observed MDP, Hidden Markov Model, Markov Chain, etc. For example, an alternative implementation that applies Hidden Markov Models (HMMs) is a supervised approached that requires the actual health indicator values and domain knowledge for training. However, the RL MDP based implementation described in FIGS. 1-7 is trainable independent of actual health indicator values and domain knowledge. Further, in HMM the coarse definition of health levels does not allow for comparison between different observations in the same level. It is also noted that HMM considers actions as dimensions in states that has N×M observation states and H hidden states (or HMMs) given that there are N unique states and M unique actions. HMM is thus more computationally expensive than the RL MDP based implementation described herein that has N observation states and zero hidden state.

Figure 3:
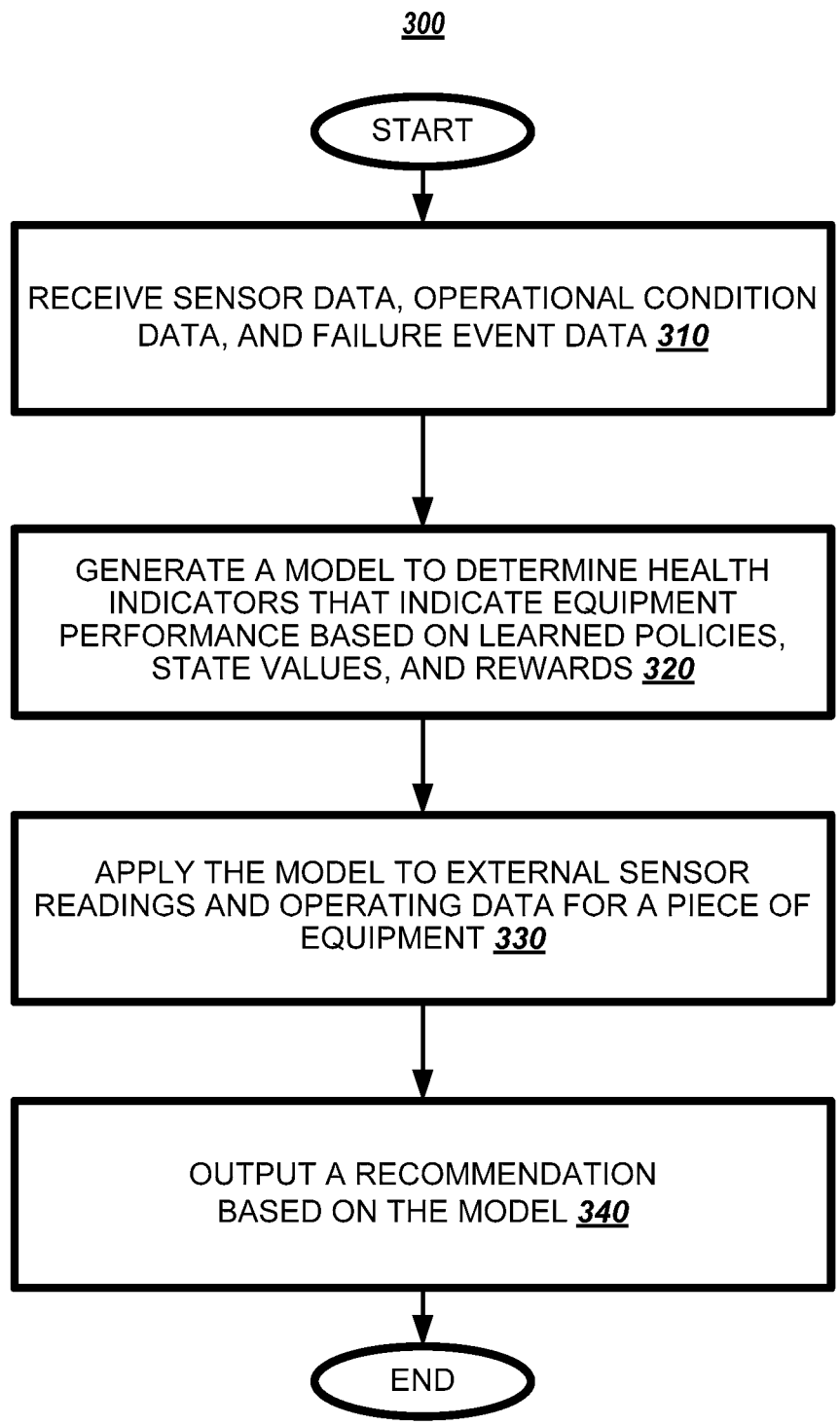
FIG. 3 illustrates a flow chart of an example health indicator learning and inference process in accordance with an example implementation.

FIG. 3 illustrates a flow chart of an example health indicator learning and inference process 300 in accordance with an example implementation. The health indicator process 300 can be a method performed by processing logic that may comprise hardware (circuitry, dedicated logic, etc.), software (such as operates on a general purpose computer system or a dedicated machine), or a combination of both. Though the health indicator process 300 is described herein as being performed by a processing device, health indicator process 300 may also be performed by other processing logic.

At 310, the processing device receives sensor data, operational condition data, and failure event data. At 320, the processing device generates a model to determine health indicators that indicate equipment performance based on learned policies, state values, and rewards. In an example implementation, generating the model can include building a state machine based on the sensor data, the operation condition data, failure event data, where the learned state values indicate health score associated with each state of the state machine. For example, generating the model includes transforming the sensor data, operational condition data, and failure event data into discrete states values and actions; building an MDP to indicate state transitions of different actions; and learning the policies as a probability of an action for a given state.

In an example, the rewards can be based on fault rewards and/or failure rewards and optimized by constraints that let the machine follow certain health degradation behavior. The learned policies are a probability of an action for a given state, which can be learned from data or simply given. The value function can be learned using model-based or model-free methods. In another example, the value function is learned using model-free reinforcement learning with function approximation to learn a continuous value function including at least one of Temporal Difference Policy Evaluation and Monte Carlo Policy Evaluation.

At 330, the processing device applies the model to external sensor readings and operating data for a piece of equipment, as described in reference to FIG. 4. At 340, the processing device outputs a recommendation based on the model. The recommendation can include anomaly detection, failure prediction, remaining useful life estimation, and operation recommendation of the piece of equipment. The recommendation can include an action change and/or not to change to an operation condition of the piece of equipment.

For example, the recommendation can be alerts based on the external sensor readings and the operating data in view of learned failure thresholds and confidence levels from the model. In an example implementation, the recommendation can include an action to change the piece of equipment to a desired next state, where the external sensor readings and operating data are associated with a current state. The model identifies the desired next state as having an health indicator that is better than the next state if taking other actions. If the recommendation comprises multiple actions, the processing device can rank the actions based on predicted health indicators associated with each of the multiple actions to prioritize preventive maintenance actions.

FIG. 4 illustrates an example health indicator application process 400 in accordance with an example implementation. The health indicator application process 400 can receive a data stream of observed equipment states (e.g., sensor data stream 410 and operational condition data stream 412), apply policies and MDP modeling learned from the health indicator learning process 100 of FIG. 1 to perform AD 470, FP 472, RUL 474, and OR 476.

In an example implementation, collected sensor data and operating data of the sensor data stream 410 and operational condition data stream 412 is transformed at 420 to into discrete states values and actions. For example, the sensor data stream 410 can include external sensor readings and operational condition data stream 412 can include operating data for a piece of equipment. The data is transformed at 420 to output state sequences 430 and action sequence 434. Learned value function 450 from the health indicator learning process 100 are applied to state sequences 430 and the action sequences 434 to derive a health indicator sequence 460 and generates a learned regression model 462. For example, a score for a health indicator sequence 460 (i.e., a health indicator score) can be based on range from 0 to 1, 0 to a 100, −1 to 1, etc. to indicate a relative performance condition of the equipment. One or more health indicator sequences 460 of states can be used to output anomaly detection 470 based on a failure threshold of health scores and confidence level. The learned regression model 462 is used for failure prediction 472, Remaining Useful Life prediction 474, and/or Operation recommendation 476 as described in FIGS. 5-7.

The health indicator application process 400 is not limited to learn health indicators and can also be used to learn a wide range of different objectives. For example, when the reward function is defined as operating cost, the health indicator application process 400 can be used to minimize operating cost of equipment. Additionally, multiple objectives can be combined to define new reward functions to satisfy multi-objective optimization purpose (e.g., maximize RUL and minimize cost simultaneously).

Figure 5:
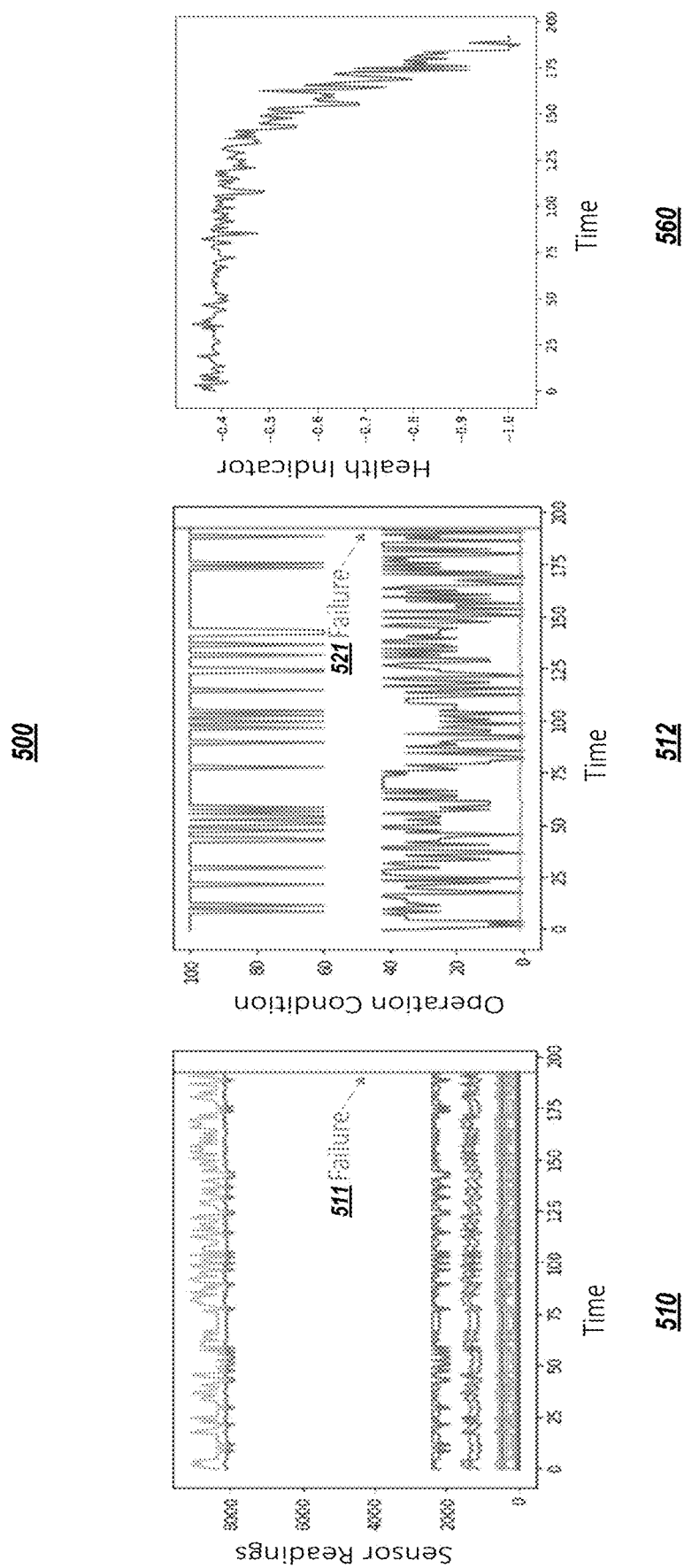
FIG. 5 illustrates sample data in accordance with an example implementation.

FIG. 5 illustrate sample data in accordance with an example implementation including sensor data 510 (e.g., sensor sequential data 110 of FIG. 1 and sensor data stream 410 and operational condition data stream 412 of FIG. 4), operation condition data 512 (e.g., operation condition sequential data 112 of FIG. 1 and sensor data stream 410 and operational condition data stream 412 of FIG. 4), and health indicator data 560 (e.g., health indicator sequences 160 of FIG. 1 and health indicator sequences 460 of FIG. 4).

In an example implementation, the sensor data 510 can include data from multiple sensors (e.g., 21 sensors), and the operation condition data with multiple operational settings (e.g., 3 settings). In the illustrated sample, a failure event 511, 521 occurs at the end of the time series is indicated as a vertical line. The method learns from the input data and outputs a one dimensional health indicator data 560 to indicate the health condition of equipment.

Data Transformation

In example applications, sensor readings (e.g., sensor sequential data 110 of FIG. 1 and sensor data stream 410 and operational condition data stream 412 of FIG. 4) are continuous and recorded in a high frequency. Sensor readings can be represented from n sensors at time t as $\{x_1^t, x_2^t, \ldots, x_n^t\} \in R$ where t=1, 2, ... T is the time step. Operation conditions represented as $\{y_1^t, y_2^t, \ldots, y_m^t\} \in R$ for the m operational settings (e.g., speed, loading, temperature, etc.). An example aspect reduces the complexity of the model by discretizing sensory data into N clusters $S=\{s_1, s_2, \ldots, s_N\}$ (e.g., N states). Discretization can transfer continuous functions, models, variables, and equations into discrete counterparts. The operation condition data is also clustered into $\{c_1, c_2, \ldots, c_O\}$. Actions are the change of operation conditions. The vector between two clusters can be used to represent an action. Thus, the action space is $A=\{a_1, a_2, \ldots, a_M\}$.

Building the Markov Decision Process

After transforming the raw data into discrete states and actions, model-based RL method can be used to learn health indicators. Other implementations can use model-free RL methods such as Temporal Difference Policy Evaluation and Monte Carlo Policy Evaluation. Model-based RL enables supervised learning methods to efficiently learn model and reason about model uncertainty. In an example implementation, a model $\mathcal{M}$ is defined as a representation of MDP<$S, \mathcal{A}, \mathcal{P}, \mathcal{R}$>, parameterized by η. The model $\mathcal{M} = <\mathcal{P}_\eta, \mathcal{R}_\eta>$ represent state transitions $\mathcal{P}_\eta \approx \mathcal{P}$ and rewards $\mathcal{R}_\eta \approx \mathcal{R}$:

$$s^{t+1} \sim \mathcal{P}_\eta(s^{t+1} | s^t, a^t) \quad \text{Eq. 1}$$

$$R^{t+1} = \mathcal{R}_\eta(R^{t+1} | s^t, a^t) \quad \text{Eq. 2}$$

In an example, assume state space S and action space A can be fully observed, and conditional independence between state transitions and rewards:

$$P[s^{t+1}, R^{t+1} | s^t, a^t] = [s^{t+1} | s^t, a^t] P[R^{t+1} | s^t, a^t].$$

To estimate model $M_\eta$ from experience $\{s^1, a^1, R^1, s^2, a^2, R^2 \ldots, s^T\}$ the problem can be transformed to a supervised learning problem, in which learning s, a→R is a regression problem and learning s, a→s' is a density estimation problem, where s' is the state after taking action a given state s. A Table Lookup Model can be used to solve the MDP.

TABLE 1

Learning MDP model from real experience data

1. Cluster raw sensor data and operational data into N and M clusters, respectively
$S = \{s_1, s_2, \ldots, s_N\}, A = \{a_1, a_2, \ldots, a_M\}$
2. Model MDP by counting visits N(s, a) to each state action pair(s, a) in sequence $< s^1, a^1, R^1, s^2, a^2, R^2, \ldots s^T >$ $$P_{sa}(s') = \frac{1}{N(s,a)} \sum_{t=1}^{T} 1(s^t, a^t, s^{t+1} = s, a, s')$$

$$R_s^a = \frac{1}{N(s,a)} \sum_{t=1}^{T} 1(s^t, a^t = s, a)R^t$$

To define the reward function $R^t$ in Table 1, a first scenario can be with labels and a second scenario can be without labels.

1) In the first scenario when labels about past faults and failures are available:

$$R^t = -\alpha U(s^t) - \beta V(s^t) \quad \text{Eq. 3}$$

where $U(s) \in \{0,1\}$ are failure labels and $V(s) \in \{0,1\}$ are fault labels, 1 indicates failure or fault occurrence, and $\alpha, \beta \in [0,1]$ are coefficients indicating impacts of failures and faults. If $\exists U, V \in \{0,1\}$, a constraint of $\beta < \alpha$ is added to let the failures have more impact than the faults. If $\not\exists U$, then $\alpha=0$, and if $\not\exists V$, then $\beta=0$.

2) In the second scenario when labels are not available, the reward function can be defined according to state living time:

$$R^t = \frac{\sum_{t=1}^{t} 1(s = s^t)}{TN(s^t)} \quad \text{Eq. 4}$$

where T is the length of sequence as shown in Table 1, and $N(s^t)$ is the number of occurrence of $s^t$. In an example, this definition is particularly useful for extremely reliable industrial equipment where no faults or failures cannot be detected or do not even exist. As used herein, failure can represent failure and/or fault.

Learning Value Functions

Given the learned MDP, the state values are learned to represent the health indicators for equipment operated under certain policies. In an example, the objective function can be defined as Bellman Expectation Equation, as illustrated in Table 2. Since the Bellman Expectation Equation is a linear function, it can be transformed to an n-variable equations problem (n variables, n equations) and solved by various methods as understood by one of ordinary skill in the art. For example, dynamic programming can be used to solve n-variable equations, as illustrated in Table 2. Policy $\pi(a|s)$ can be learned from data or is given.

TABLE 2

Value Function Learning with Dynamic Programming

Initialize $v(s) = 0, s \in S, k = 0$
do $$v_{k+1}(s) = \sum_{a \in A} \pi(a \mid s)\left(R_s^a + \gamma \sum_{s' \in S} P_{sa}(s')v_k(s')\right)$$

while $v_{k+1}(s) - v_k(s) >$ threshold

Accordingly, at time t the value function v(s) maps the sensor and operation condition data $\{x_i^t, y_j^t\}$ to health indicators H(t), which depict the health degradation of the equipment operated under policy $\pi$.

$$H(t) = v_\pi(s^t | s^t = s)$$

Figure 6:
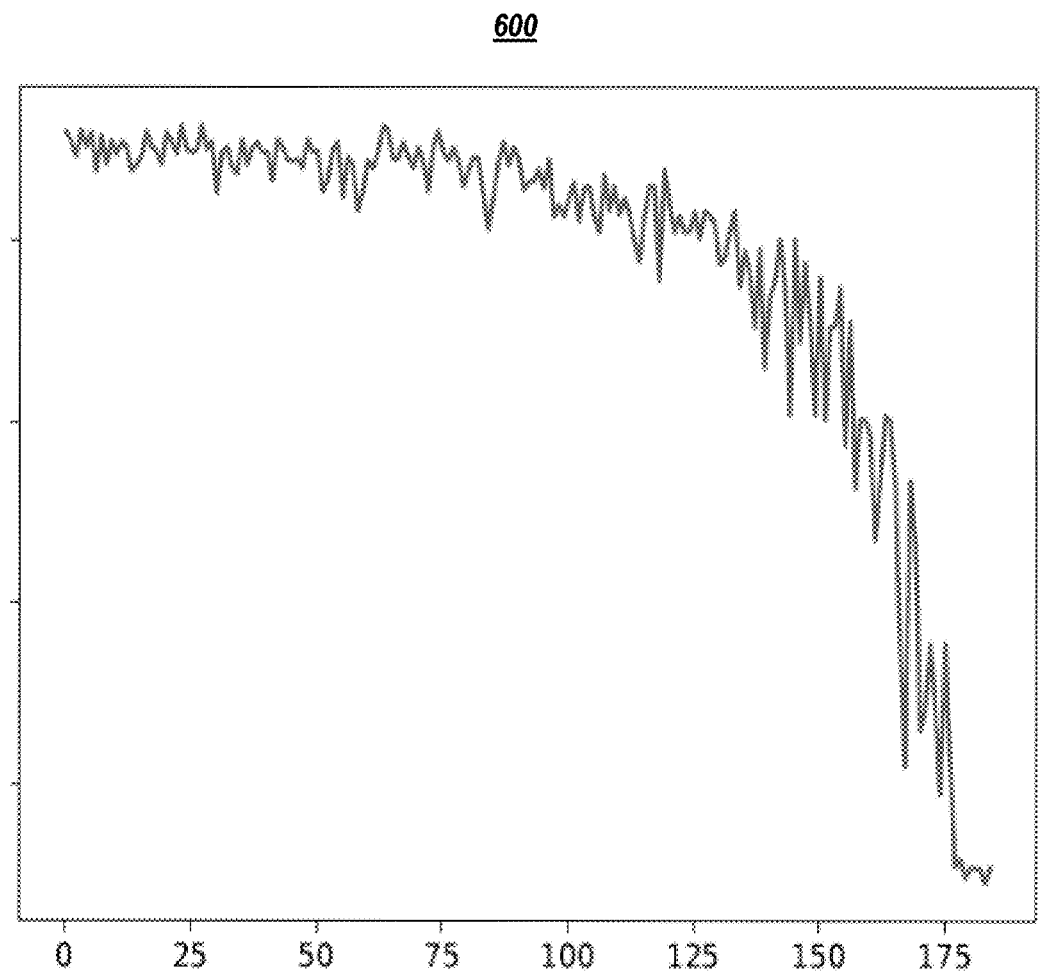
FIG. 6 illustrates sample health indicator sequence for run-to-failure data in accordance with an example implementation.

FIG. 6. at graph 600 illustrates an example of health indicator sequence H(t) for run-to-failure data of equipment. In an example implementation of health indicators for a jet engine showing performance degradation of the jet engine operated under a policy. Graph 600 illustrates the jet engine starting with an optimal health indicator score at time 0. Based on sensor readings and operating data for the jet engine, a learned model is applied to determine health indicators that indicate equipment performance. Graph 600 illustrates the run-to-failure data to detect whether the jet engine fails within a given time window. Modeled detection of failures for the type of jet engine is used to predict when a failure will occur for the jet engine based on the sensor reading and operating data. Health indicators are mapped to sensor reading intervals illustrated along the x-axis of graph 600. In this example, the health indicator scores display a greater deviation from an optimal state starting at approximately time 75 and degrading rapidly at approximately time 125 becoming unusable by time interval 175.

Recommendations can include changing a policy for an operating condition based the run-to-failure predication using health indicator scores. Policies are used to determine the probability of taking a specific action at a specific state. For example, the model can indicate that reducing the speed, rate of acceleration, atmosphere, etc. for the jet engine will improve and/or extend the remaining useful life of the jet engine.

Tuning Hyper Parameters

The value function can be decided by the discount factor $\gamma$ and reward function R, and two widely accepted properties can be used as constraints (e.g., FIG. 1 at 136) to fine tune the two hyper-parameters.

The hyper-parameters can be described based on: Property 1) Once an initial fault occurs, the trend of the degradation signals should be monotonic; and Property 2) Despite the operation conditions and failure modes, the health indicator for the same or similar type of equipment minimizes the variance of failure threshold (e.g., a common health indicator that can capture failures, despite of the varieties of failure modes and operation conditions). Accordingly, the hyper parameters with the minimal variations of health indicator at failures are used, and the monotonicity of H(t) is also checked when choose the hyper parameters.

The learned health state model can be used to solve multiple predictive maintenance problems. For example, health indicator sequences 460 for each state can be used to output anomaly detection 470, failure prediction 472, remaining Useful Life prediction 474, and/or Operation recommendation 476.

Figure 7:
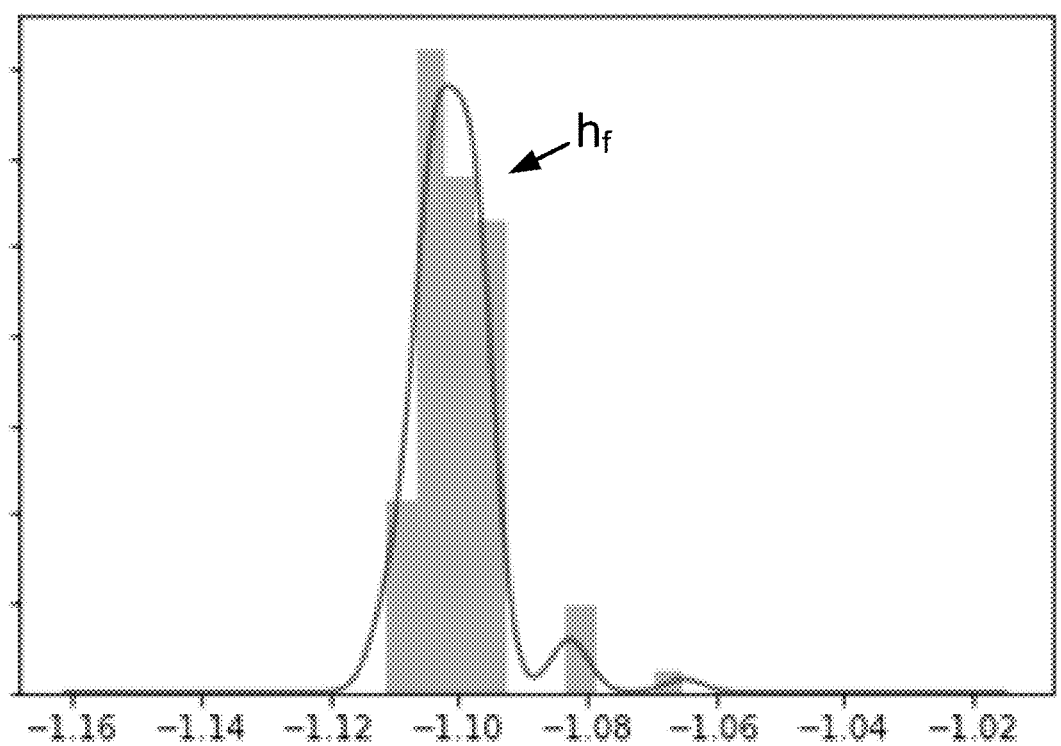
FIG. 7 illustrates an example density function of health indicators at failures in accordance with an example implementation.

FIG. 7 at graph 700 illustrates an example density function of health indicators at failure in accordance with an example implementation. The density function of graph 700 illustrates a percentage of the population that will fail for an action within a threshold or range. The thresholds can be learned since failure for a piece of equipment in a common population should fail consistently within a range to be informative. In an example, multiple pilots fly with a similar type of jet engine under different operating conditions (e.g., take-off speed, cruising altitude, jet fuel composition, etc.). In another example, a type of automobile is driven under different operating conditions (e.g., tire pressure, road surfaces, ambient temperature, etc.). Based on the different conditions of the equipment or behaviors of the operators, policies are applied to determine the percentage of the equipment that fails for an action with a range used as a set threshold to learn a confidence level. For example, the graph 700 illustrates a high percentage of failure between −1.09 and −1.12 as a smaller range. The graph 700 also includes other ranges with smaller indications of faults or failure between −1.09 and −1.07 and between −1.07 and −1.06. The objective is to minimize the width of the range to enforce the failures fall into the same small range (i.e., minimize variance of failure threshold), based on tuning the hyper parameters in the model.

Anomaly Detection

Using the learned health indicator h(t) for all the run-to-failure sequences, the density function F(h) of the health indicator at failures can be estimated as illustrated in FIG. 7. The most likely health indicator value is $h_f$=argmax(F(h)), and the area between the read dash lines represent the confidence level c (e.g., 95%):

$$c = \int_{h_{f\_min}}^{h_{f\_max}} F(h)dh$$

where $h_{f\_min}$, $h_{f\_max}$ are the lower and upper boundaries of failure threshold.

For example, graph 700 illustrates an example density function of health indicators at failure in accordance with an example implementation Accordingly, for a testing sequence of h(t):

$$T'=H^{-1}(h_f)=H^{-1}(\text{argmax}(F(h)))$$

where $h_{f\_min} \leq h \leq h_{f\_max}$, and T' is the detected time step of failure occurrence.

In the testing phase and/or application phase, the health indicator of steam data is calculated in real-time and used to detect failures within certain confidence level as described in FIG. 4.

Failure Prediction and Remaining Useful Life Estimation

In an example implantation to perform prediction tasks, the learned health indicators can be fed into regression models to build a prediction model of h(t). As a result, given {..., h(t−2), h(t−1), h(t)}, the method can predict the future health indicators {h(t+1), h(t+2), ..., h(t+w)} where w is the failure prediction window. The FP problem can be converted to the anomaly detection problem and can be solved using the AD approach as described herein. Further, RUL problem can also be solved using the approach as understood by one of ordinary skill in the art.

Operation Recommendation

The learned value functions represent true health indicators H(t) which can then be used to recommend operations in various applications. For example, when sequences of state-action pairs $<s^t, a^t>_i$, t=1, 2, ..., i=1, 2, ... are given, $h(t)=v(s^t)$ is the estimated scores for each sequence. Thus, sequences with low health scores and actions leading to severe performance degradation can be found. In an example implementation, the recommend can include alerts or corrective action to avoid severe performance degradation indicated by the low health scores.

Further, when only initial state $s^t$ and a set of policies $\{\pi_i(a|s=s^t)\}$ are given, h(t) can be predicted using the regression model. Operation recommendations with the objective of maintain higher health indicators can be achieved.

It should be noted that alternative methods for health state modeling are possible. For example, the machine health evolution is herein formalized as a fully observed MDP, but can also be solved under Markov Chain, Hidden Markov Model, and Partially Observed MDP (POMDP).

For certain types of equipment and/or machines which do not have explicit actions, the MDP model can be transformed to Markov Chain by removing or merging $a_i$ into $s_i$, as described in reference to FIGS. 2A-B, such that $<s_i, a_i>$ is transformed to new node $s_i'$. By doing this, the algorithm in Table 1 can still be applied to value function learning to perform the PdM tasks (e.g., 470-476 of FIG. 4).

The MDP model described in reference to FIG. 2B can be differentiated from Hidden Markov Models in multiple ways include that: a) HMM is supervised and requires the actual health indicator values for training (e.g., as differentiated from t the example RL based health indicator processes of FIGS. 1-7 described herein that do not require the actual health indicator values for training); b) HMM based approaches to PdM typically artificially create labels defining different health levels (e.g., as differentiated from the example RL based health indicator processes of FIGS. 1-7 described herein that do not require artificially created labels). For example, hidden states in a single HMM model and HMMs in a multi-HMM model usually represent H(=3~5) different health statuses such as good, good-medium, medium-bad, bad, etc. Thus in contrast to the example RL based health indicator processes of FIGS. 1-7 described herein, HMM can be applied successfully in limited when a) there is a limited number of explicit health states which have meaning in the domain of the equipment; and 2) the actual assessment for the health of equipment is available in historical data. A coarse definition of health levels prohibits effective comparisons between different observations in the same level. Moreover, definition and segmentation of health levels typically require a significant domain knowledge. In contrast, the proposed method discovers the evolution of health indicators automatically by learning values for N(>>H) discrete sensory states.

It should be noted that the example RL based health indicator processes model operation data (e.g., actions) separately from sensory data (e.g., state), whereas HMM considers actions as dimensions in states. The HMM approach leads to N×M observation states and H hidden states (or HMMs) requiring substantially more computational resources and thus more expensive and less efficient than the RL based health indicator processes described herein. For example, the RL based health indicator processes has N observation states and zero hidden state making it more efficient and less expensive than HMM approaches.

It should be noted that when the observed data cannot fully represent MDP, the problem becomes a POMDP. An example aspect of the present disclosure can be integrated with generative models to generate observations and estimate its state and state dynamics. Using generative model can extend the RL based health indicator processes described herein to POMDP.

Figure 8:
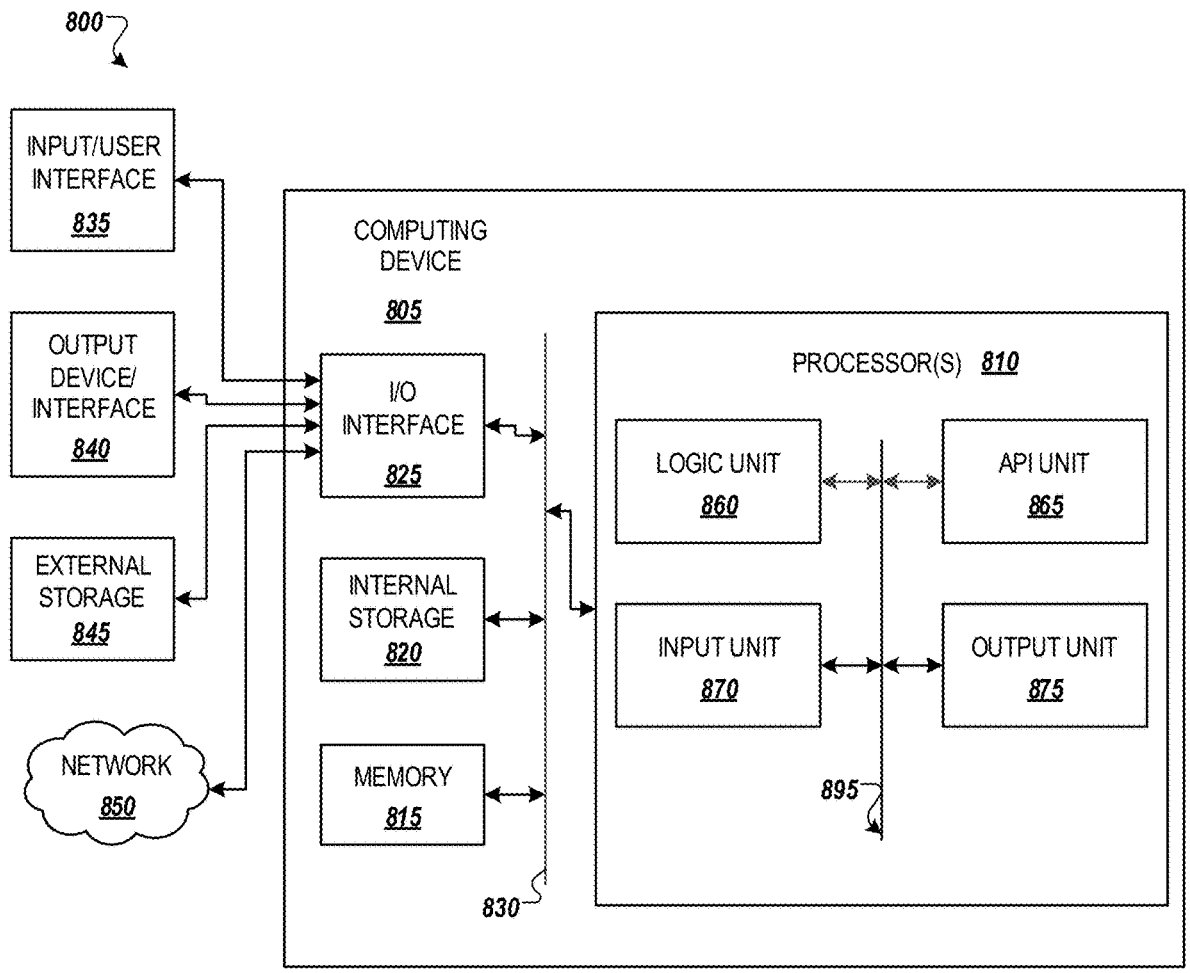
FIG. 8 illustrates an example computing environment with an example computer device suitable for use in some example implementations.

FIG. 8 illustrates an example computing environment 800 with an example computer device suitable for use in some example implementations, such as for facilitating the health indicator processes as illustrated in FIGS. 1-6. Computer device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computer device 805.

Computer device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805.

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via I/O interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, input unit 870, output unit 875, in some example implementations described above. For example, the flow of one or more processes or implementations may be controlled by logic unit 860 alone or in conjunction with API unit 865.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "receiving," "generating," "learning," "applying," "outputting," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The processor 810 is configured to receive sensor data, operational condition data, and failure event data as illustrated in FIG. 1 at 120 and 146 and FIG. 3 at 310. The processor 810 is configured to generate a model to determine health indicators that indicate equipment performance based on learned policies, state values, constraints, and rewards as illustrated in FIG. 1 at 150 and FIG. 3 at 320.

In an example implementation, the processor 810 is configured to build a state machine based on the sensor data, the operation condition data, failure event data, where the learned state values indicate health score associated with each state of the state machine as illustrated in FIGS. 2A-2B and FIG. 5. For example, processor 810 is configured to generate the model includes transforming the sensor data, operational condition data, and failure event data into discrete states values and actions; build a MDP to indicate state transitions of different actions; and learn the policies as a probability of an action for a given state as illustrated in FIG. 1 at 130, 134, 136, 142, 144, 146 and FIG. 2B.

In an example, processor 810 is configured to learn rewards based on fault rewards and/or failure rewards as illustrated in FIG. 1 at 146 and FIG. 5. In an example, the processor 810 can be configured to learn policies as a probability of an action for a given state and the value function is learned using model-based reinforcement learning. In another example, the processor 810 can be configured to learn value function using model-free reinforcement learning with function approximation to learn a continuous value function including at least one of Temporal Difference Policy Evaluation and Monte Carlo Policy Evaluation.

The processor 810 is configured to apply the model to external sensor readings and operating data for a piece of equipment as illustrated in FIG. 3 at 330. The processor 810 is configured to output a recommendation based on the model as illustrated in FIG. 3 at 340 and FIG. 4 at 470, 472, 474, 476. For example, the processor 810 is configured to include at least one of anomaly detection, failure prediction, and remaining useful life of the piece of equipment as the recommendation as illustrated in FIG. 4 at 470, 472, 474, 476.

The processor 810 can be configured such that the recommendation includes an action change to an operation condition of the piece of equipment as illustrated in FIG. 3 at 340. The processor 810 can be configured to output the recommendation including alerting an operator not to change an operating condition for the piece of equipment as illustrated in FIG. 3 at 340. The processor 810 can be configured such that the recommendation includes alerts based on the external sensor readings and the operating data in view of learned failure thresholds and confidence levels from the model as illustrated in FIG. 3 at 340 and FIG. 4 at 476.

Figure 9:
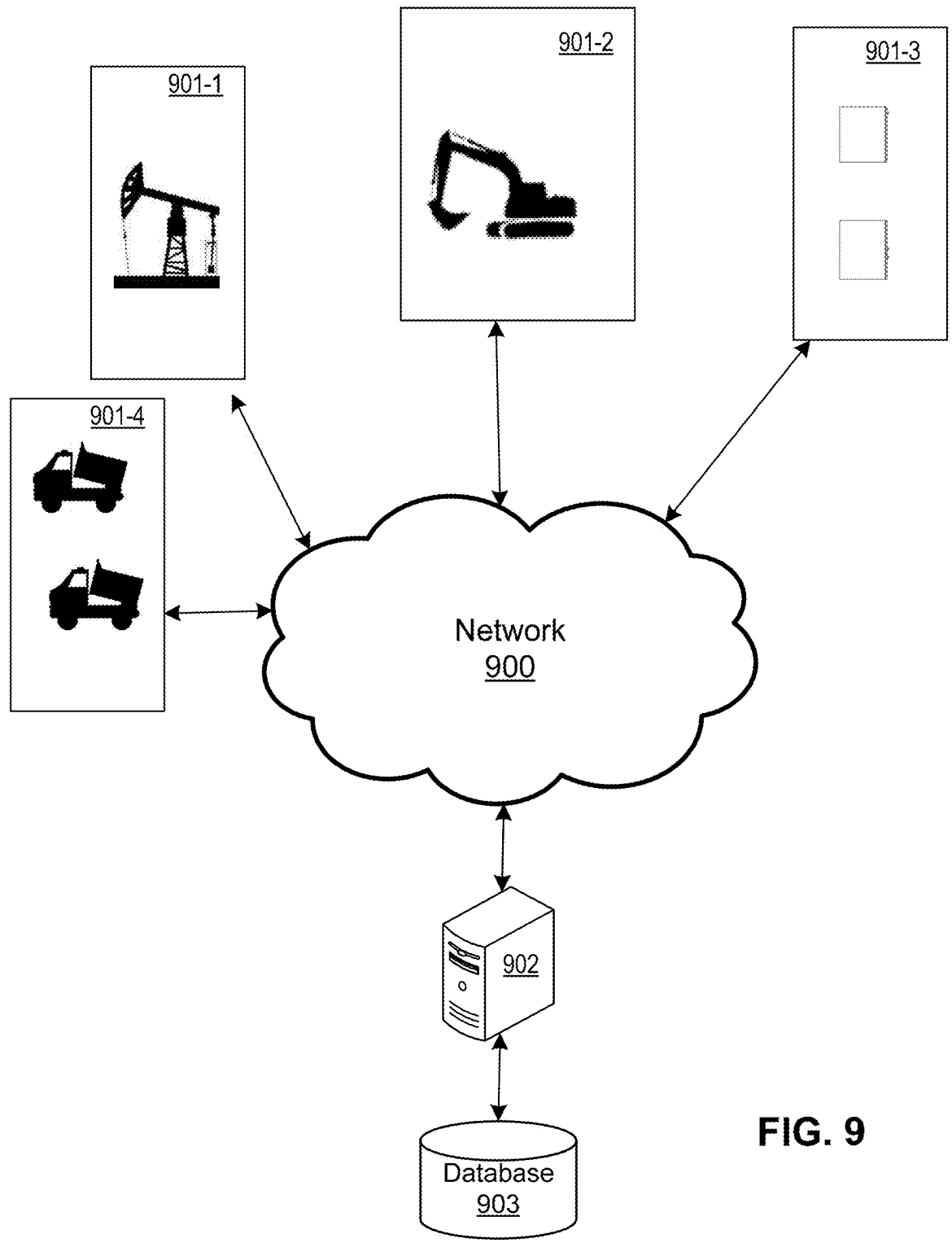
FIG. 9 illustrates an example system upon which example implementations may be applied.

The recommendation or action change can be executed by the processor 810 on the equipment as described in FIG. 9 including coolers, air conditioners, servers, as well as mobile apparatuses such as automobiles, trucks, cranes, as well as any other apparatuses that undergo periodic maintenance or experience faults and failures. In a jet engine operation example, recommendations can indicate hours of operation when a component is predicted to fault or fail. Alerts can be triggered when the sensor inputs a condition that the model indicated is probable to cause a fault or require a critical maintenance action. For example, when a jet engine is operated in an extreme temperature condition for a specific amount of time, the alert can indicate a countdown time for when similar jet engines experience a fault after operated in a similar extreme temperature condition for a similar amount of time. Further, alerts can be provided to the operator (i.e. pilot) to thresholds amounts of time for operation in the extreme temperature condition that accelerate and/or increase severity faults. Accordingly, an operation action, condition change, and/or maintenance action can be recommended to reduce the likelihood of a fault and/or failure. In another example, the recommendation can indicate to an operator of an automobile to change operation behaviors for acceleration, breaking, timing for oil change, as well as operating conditions such as quality of oil or gasoline, types of surfaces to avoid, harmful whether conditions, etc.

The processor 810 can be configured wherein the recommendation includes multiple actions that are ranked based on predicted health indicators associated with each of the multiple actions as illustrated in FIG. 3 at 340 and FIG. 4. In an example implementation, the processor 810 can be configured such that the recommendation includes an action to change the piece of equipment to a next state, where the external sensor readings and operating data are associated with a current state as illustrated in FIG. 4. The processor 810 can be configured such that the model identifies the next state as having an improved health indicator degradation over the current state as illustrated in FIG. 2B and FIG. 4.

The processor 810 is configured to generate the model to determine health indicators independent of configuration by a domain expert, can be applied when failures are rare or failure data is unavailable, and is independent of artificial labels. That is, the 810 is configured to output recommendations when failure and/or fault information is missing from the external sensor and/or operating information by applying the model generated based on learned polices, state values, and rewards.

FIG. 9 illustrates a system involving a plurality of apparatuses and a health indicator apparatus, in accordance with an example implementation. One or more apparatuses or apparatus systems 901-1, 901-2, 901-3, and 901-4 are communicatively coupled to a network 900 which is connected to a predictive maintenance health indicator apparatus 902. The predictive maintenance health indicator apparatus 902 manages a database 903, which contains data collected from the apparatuses and apparatus systems in the network 900. In alternate example implementations, the data from the apparatuses and apparatus systems 901-1, 901-2, 901-3, and 901-4 can be stored to a central repository or central database such as proprietary databases that data from equipment or equipment systems such as enterprise resource planning systems, and the predictive maintenance health indicator apparatus 902 can access or retrieve the data from the central repository or central database. Such apparatuses can include stationary apparatuses such as coolers, air conditioners, servers, as well as mobile apparatuses such as automobiles, trucks, cranes, as well as any other apparatuses that undergo periodic maintenance.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:
   receiving sensor data, operational condition data, and failure event data of a physical system or a piece of equipment;
   generating a regression model to determine health indicators that indicate equipment performance based on learned policies, discrete state values, and rewards;
   applying the regression model to external sensor readings and operating data for the piece of equipment; and
   outputting a recommendation based on the regression model;
   wherein generating the regression model comprises:
      transforming the sensor data, the operational condition data, and the failure event data into the discrete state values and actions;
      building a state machine to indicate state transitions under different actions;
      learning the policies as a probability of an action for a given state; and
      learning the health indicators through reinforcement learning on the discrete state values and actions to generate the regression model,
      wherein the regression model is generated without artificial labels and domain knowledge of the physical system, a non-physical system, or the piece of equipment,
   wherein outputting the recommendation comprises multiple actions each action to change the piece of equipment to a next state value of the discrete state values, wherein the external sensor readings and operating data are associated with a current state value of the discrete state values; and the regression model ranks each of the multiple actions based on a corresponding next state value of the discrete state values for a respective action having a health indicator better than the other next state value of the discrete state values for the other respective actions.

2. The method of claim 1, wherein the discrete state values indicate health score associated with each state value of the state machine.

3. The method of claim 1, wherein the rewards are based on fault rewards and failure rewards.

4. The method of claim 1, further comprising learning value functions via iterative evaluation of the policies using dynamic programming to derive the health indicators for each equipment state value.

5. The method of claim 1, wherein the learned policies are learned using model-based reinforcement learning.

6. The method of claim 1, wherein the recommendation further comprises at least one of anomaly detection, failure prediction, and remaining useful life estimation of the piece of equipment.

7. The method of claim 1, wherein the recommendation outputs a failure prediction and a remaining useful life task based on the health indicators from the regression model.

8. The method of claim 1, wherein the recommendation comprises alerts based on the external sensor readings and the operating data in view of learned failure thresholds and confidence levels from the regression model.

9. The method of claim 1, wherein the recommendation comprises multiple actions that are ranked based on predicted health indicators associated with each of the multiple actions.

10. The method of claim 1, wherein the recommendation comprises an action change to an operation condition of the piece of equipment.

11. The method of claim 1, wherein the recommendation comprises alerting an operator not to change an operating condition for the piece of equipment.

12. A system comprising:
   a memory; and
   a hardware processing device operatively coupled the memory, wherein the hardware processing device is configured to:
      receive sensor data, operational condition data, and failure event data of a physical system or a piece of equipment;
      generate a regression model to determine health indicators that indicate equipment performance based on learned policies, discrete state values, and rewards;
      apply the regression model to external sensor readings and operating data for the piece of equipment; and
      output a recommendation based on the regression model;
      wherein to generate the regression model comprises:
         transform the sensor data, the operational condition data, and the failure event data into the discrete states values and actions;
         build a state machine involving a Markov Decision Process (MDP) to indicate state transitions of different actions; and
         learn the value function as a mapping between health scores and discrete state values through reinforcement learning to generate the regression model,
         wherein the regression model is generated without artificial labels and domain knowledge of the physical system, a non-physical system, or the piece of equipment,
      wherein outputting the recommendation comprises multiple actions each action to change the piece of equipment to a next state value of the discrete state values, wherein the external sensor readings and operating data are associated with a current state value of the discrete state values; and the regression model ranks each of the multiple actions based on a corresponding next state value of the discrete state values for a respective action having a health score better than the other next state value of the discrete state values for the other respective actions.

13. A non-transitory computer-readable medium storing instructions executed by a processing device configured to:
receive sensor data, operational condition data, and failure event data of a physical system or a piece of equipment;
generate a regression model to determine health indicators that indicate equipment performance based on learned policies, discrete state values, and rewards;
apply the regression model to external sensor readings and operating data for the piece of equipment; and
output a recommendation based on the regression model;
wherein the processing device is configured to generate the regression model by:
transforming the sensor data, the operational condition data, and the failure event data into the discrete state values and actions;
building a state machine to indicate state transitions under different actions;
learning the policies as a probability of an action for a given state; and
learning the health indicators through reinforcement learning on the discrete state values and actions to generate the regression model,
wherein the regression model is generated without artificial labels and domain knowledge of the physical system, a non-physical system, or the piece of equipment,
wherein outputting the recommendation comprises multiple actions each action to change the piece of equipment to a next state value of the discrete state values, wherein the external sensor readings and operating data are associated with a current state value of the discrete state values; and the regression model ranks each of the multiple actions based on a corresponding next state value of the discrete state values for a respective action having a health score better than the other next state value of the discrete state values for the other respective actions.

14. The non-transitory computer-readable medium of claim 13, wherein the recommendation further comprises at least one of anomaly detection, failure prediction, and remaining useful life estimation of the piece of equipment.

* * * * *